(No Model.)

J. W. THOMASON.
CAR COUPLING.

No. 339,498. Patented Apr. 6, 1886.

Witnesses

Percy C. Bowen

Inventor,
John W. Thomason
By his Attorneys

UNITED STATES PATENT OFFICE.

JOHN W. THOMASON, OF SALADO, TEXAS.

CAR-COUPLING.

SPECIFICATION forming part of Letters Patent No. 339,493, dated April 6, 1886.

Application filed January 14, 1886. Serial No. 188,583. (No model.)

*To all whom it may concern:*

Be it known that I, JOHN W. THOMASON, a citizen of the United States, residing at Salado, in the county of Bell and State of Texas, have invented a new and useful Improvement in Car-Couplings, of which the following is a specification, reference being had to the accompanying drawings.

My invention relates to improvements in car-couplings; and it consists in the peculiar and novel construction and combination of parts, substantially as hereinafter fully set forth, and specifically pointed out in the claims.

Figure 1:
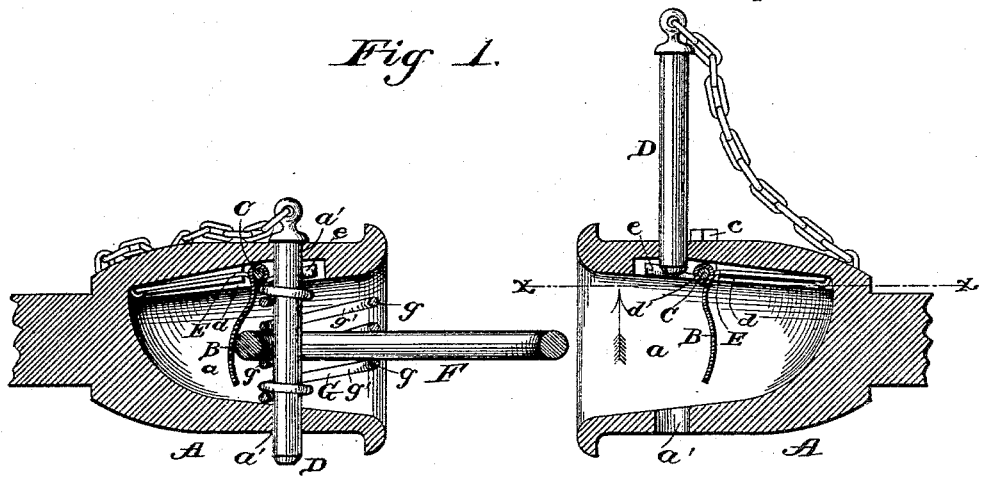
Figure 4:
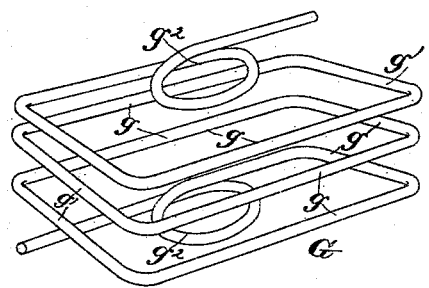
Figure 2:
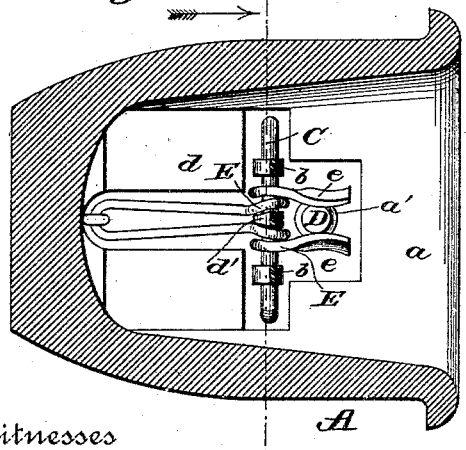
Figure 3:
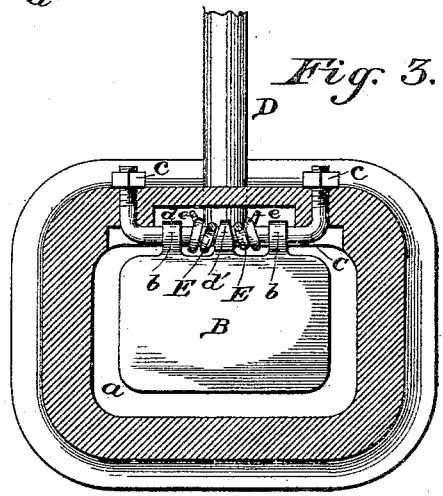

In the accompanying drawings, Figure 1 is a vertical central longitudinal sectional view through two draw-heads that are to be coupled together. Fig. 2 is a horizontal longitudinal sectional view on the line $x\ x$ of Fig. 1. Fig. 3 is a vertical transverse sectional view through the draw-head on the line $y\ y$ of Fig. 2, and Fig. 4 is a detail perspective view of my improved detachable link-holder for coupling draw-heads that lie at different heights.

Referring to the drawings, in which like letters of reference indicate corresponding parts in all the figures, A designates a draw-head that is provided with the usual chamber or compartment, $a$, and has the vertical pin-holes or openings $a'$ in the upper and lower walls of said chamber. The upper wall of the chamber is recessed or cut away, as at $d$, to receive a movable wing or plate, B, that is suspended in the draw-head in the path of an approaching link. The wing B is provided with two spaced perforated lugs or ears, $b$, that are journaled on a rod or bar, C, arranged in the draw-head, and the ends of said rod are bent and threaded and passed through openings in the upper wall of the draw-head, where they receive nuts $c$, that secure them firmly in place. The wing C is provided with another lug, $d'$, that is also journaled on the bar and disposed between the other lugs, $b$, and said lug $d'$ has its side edges beveled or curved to adapt them to act upon yielding arms E and force them farther apart to drop a pin held between said arms. The yielding pin-retaining arms are coiled around the bar C, and are extended rearwardly, where they are pivotally connected to the upper wall of the draw-head, as shown more clearly in Figs. 1 and 2. The pin-retaining arms have their free ends flattened, as at $e$, and bent upwardly and inclined to more firmly support the coupling-pin D, which is of the ordinary form, and said arms are disposed on opposite sides of the cam-lug $d'$ of the movable wing to adapt the arms to be acted upon simultaneously. The movable wing is preferably curved, as shown in Fig. 1, to adapt the curved end of the link to strike or operate upon the same fairly, and when the wing is forced rearwardly by link it enters the recessed portion of the upper wall of the draw-head and lies flush therewith.

The coupling-link F and pin D are of the common well-known form, and the pin is connected by a chain with the draw-head to prevent it becoming lost or misplaced.

G designates the link-supporting device, which is removable from and adapted to fit in draw-heads of different sizes, and the said support is held and retained in the draw-head in which it is placed by the tension of its spring-bars bearing against the upper and lower walls of the draw-head. The support G is made or bent from a single piece of stout wire or other spring or elastic metal, and it is square or rectangular in shape to accommodate itself to the form of the draw-head chamber. The horizontal side bars, $g$, are arranged in different planes or elevations, and connected by end bars, $g'$, that are inclined in opposite directions, the free ends being formed into loops $g^2$, that are disposed in the same vertical plane, the ends of the loops being extended to the plane of the end bars of the device, as clearly shown in detail in Fig. 4. The side bars of the upper and lower horizontal parts of the link-support are disposed in the same plane, so that the device will fit snugly in the draw-head.

When the device is placed in the draw-head, the loops $g^2$ thereof are in alignment with the pin-holes $a'$, to permit the coupling-pin to pass therethrough to enter and retain one end of the link within the draw-head, as is obvious. By means of this device the coupling-link is securely held in position for being coupled or connected to a car, and the link can be adjusted vertically between any two of the said spring-bars to accommodate the link to draw-heads of different heights. The supporting device also prevents the link from movement or rattling in the draw-head.

The operation of my invention is as follows: The link-support is properly adjusted in one of the draw-heads to be coupled, the link is inserted, and the pin dropped through the link and support. The support may be placed in a draw-head of the common form, or it is placed in a draw-head provided with my improved wing, which is forced rearwardly, thereby to open the pin-retaining arms for the purpose of dropping the pin. The other draw-head to be coupled has the pin supported in an elevated position by the retaining-arms, and when the link strikes the movable wing the beveled faces of the cam-lug $d'$ thereof separates the retaining-arms to allow the pin to drop by gravity and engage the link to retain the same within its draw-head. The operation of coupling the cars is thus automatically effected, and the means whereby these results are attained are simple, strong, and durable in construction, easily and readily adjusted, thoroughly effective and reliable, and are cheap and inexpensive of manufacture.

Having thus described my invention, what I claim as new is—

1. In a car-coupling, the combination of a draw-head, the laterally-movable pin-retaining arms supported therein, and a pivoted wing normally held in the path of an approaching link, and arranged to distend the arms to drop the pin when acted on by the links, substantially as described.

2. In a car-coupling, the combination of a draw-head, a rod supported in the same, a movable wing journaled on the rod and having a cam-lug, and the yielding pin-retaining arms, substantially as described.

3. In a car-coupling, the combination of a draw-head, a rod, E, supported therein, a movable wing journaled on the rod and depending therefrom in the path of an approaching link and carrying a cam, and laterally-movable pin-retaining spring-arms supported on the rod and adapted to be acted on by the cam of the wing, substantially as described.

4. In a car-coupling, the combination of a draw-head, a rod, E, supported therein, a movable wing depending from and journaled on the rod and having a cam-lug, $d'$, and the spring pin-retaining arms coiled at their ends around the rod on opposite sides of the lug $d'$, and having the outwardly-flared ends $e$, substantially as described.

5. In a car-coupling, a link-support detachably fitted in one of the draw-heads, and comprising a series of horizontally-disposed connected bars $g$, and the loops $g^2$, arranged within the bars, all bent or formed from a single piece of wire, substantially as described.

In testimony that I claim the foregoing as my own I have hereto affixed my signature in presence of two witnesses.

JOHN W. THOMASON.

Witnesses:
  A. H. DAVIS,
  H. C. SURGHNOR.